July 31, 1934.   F. L. MILLS   1,968,500
COMMODITY VENDING MACHINE
Filed April 10, 1930    12 Sheets-Sheet 3

Inventor:
Fred L. Mills,
By Carl S. Lloyd
Atty.

July 31, 1934.  F. L. MILLS  1,968,500
COMMODITY VENDING MACHINE
Filed April 10, 1930    12 Sheets-Sheet 4
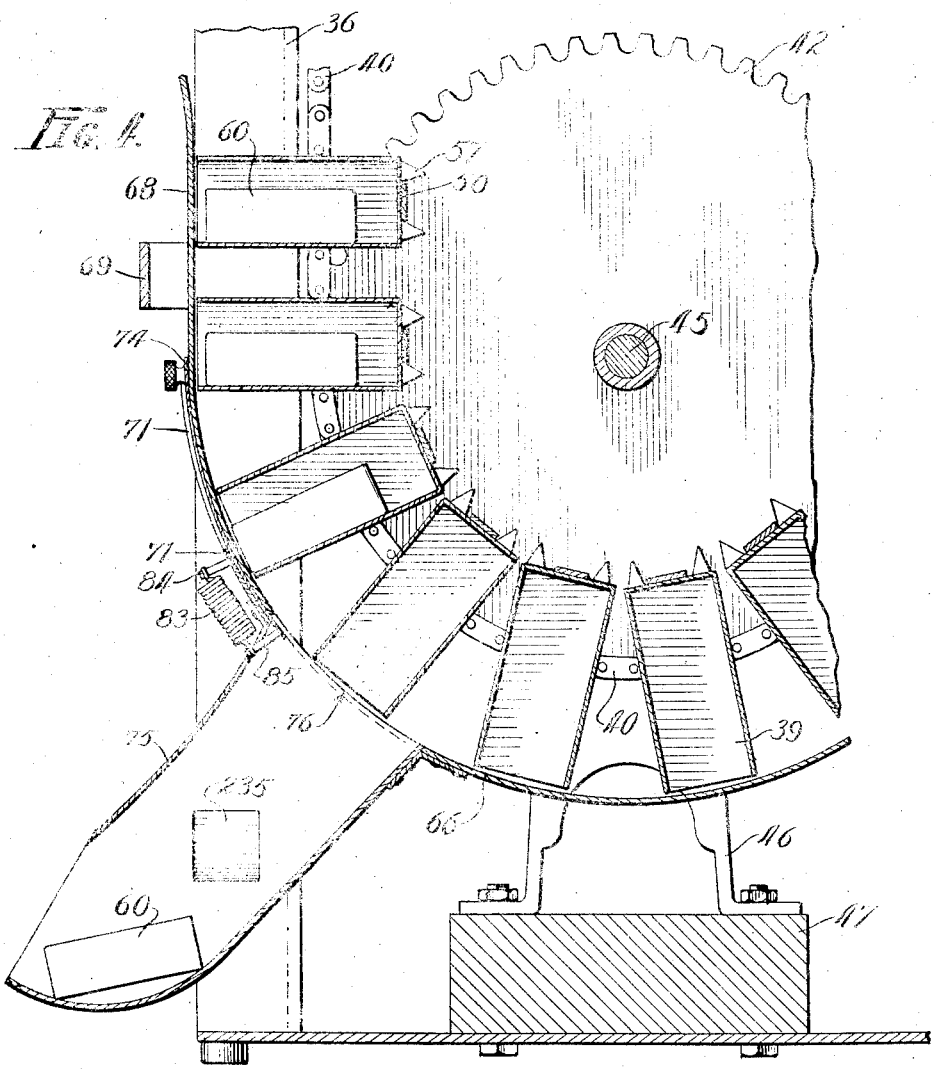
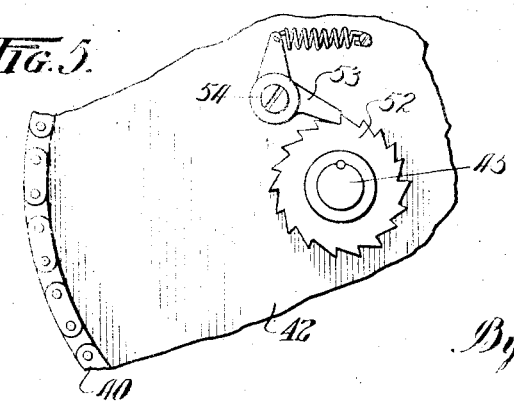
Inventor:
Fred L. Mills,
By Carl S. Lloyd
Atty.

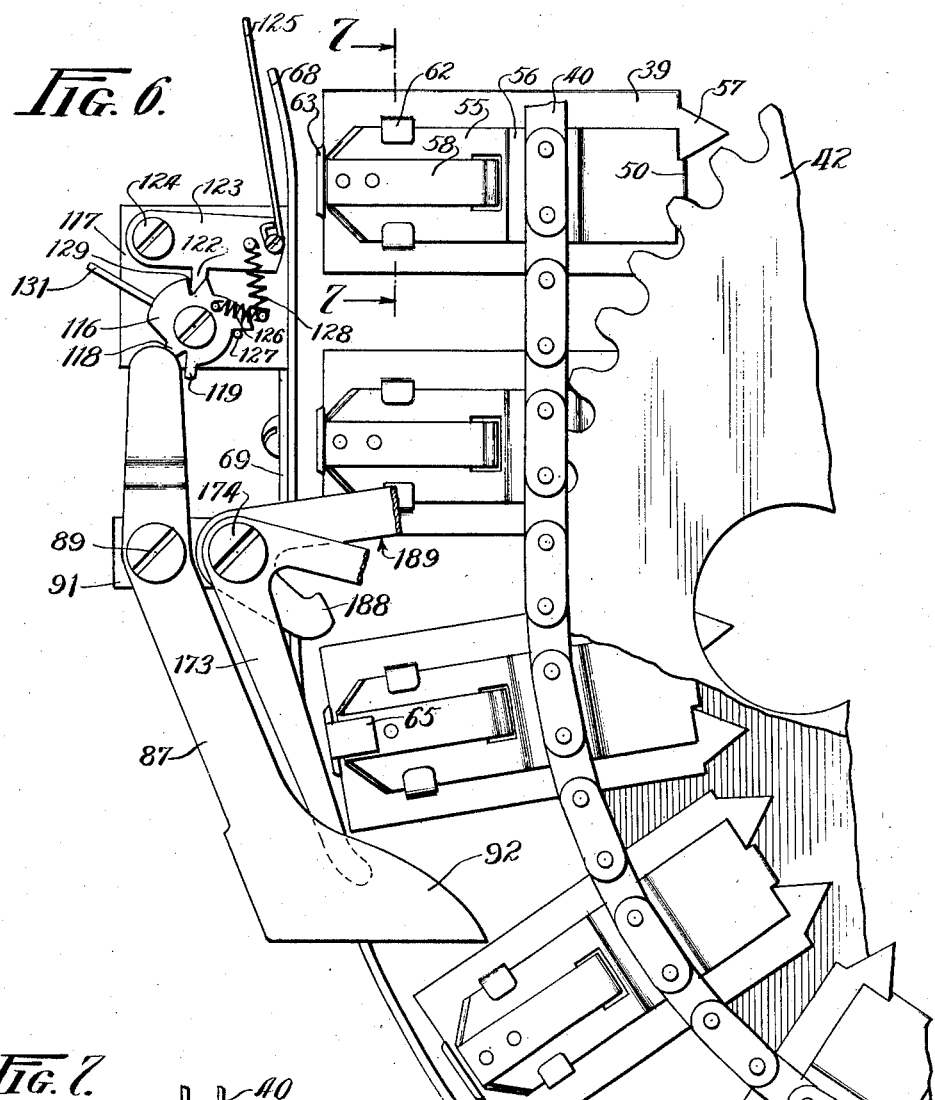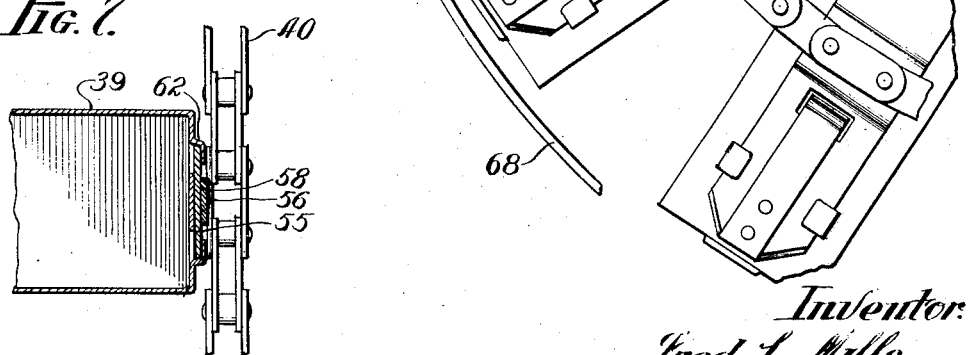

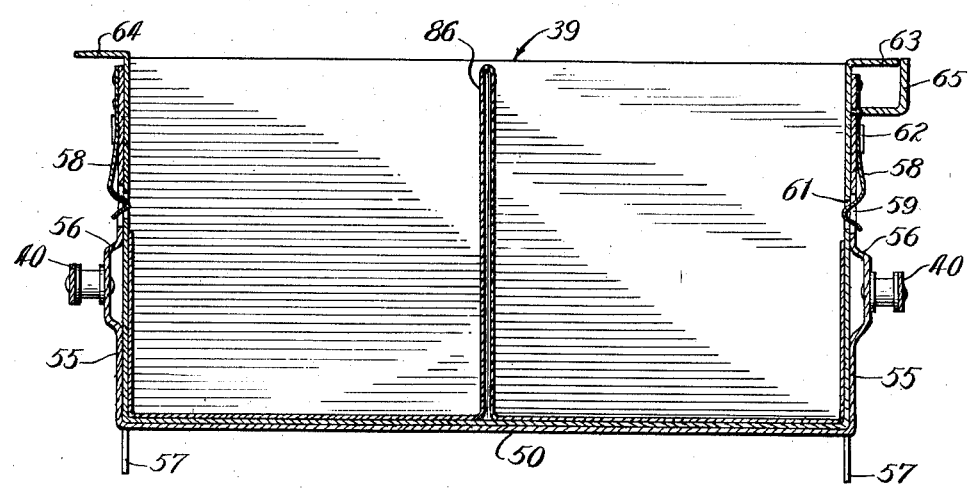
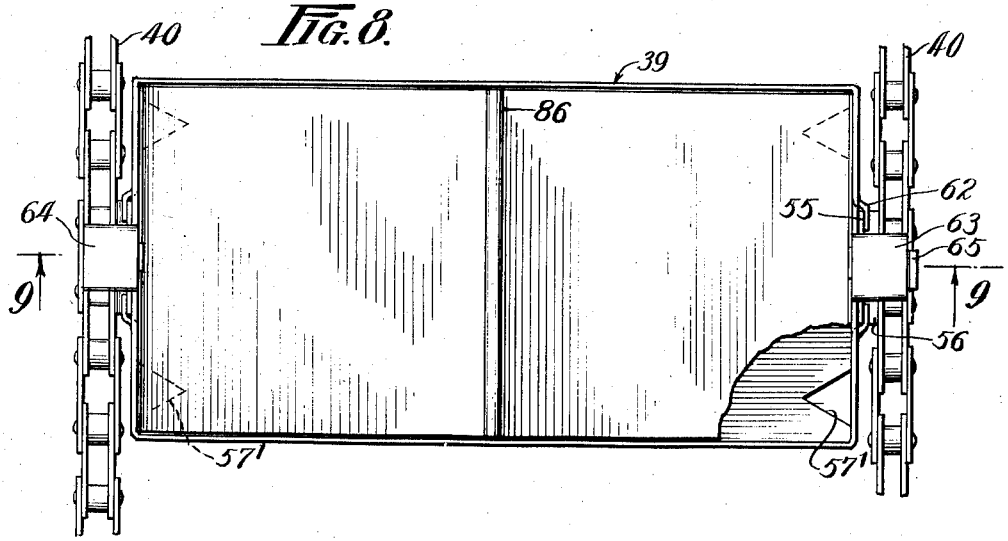

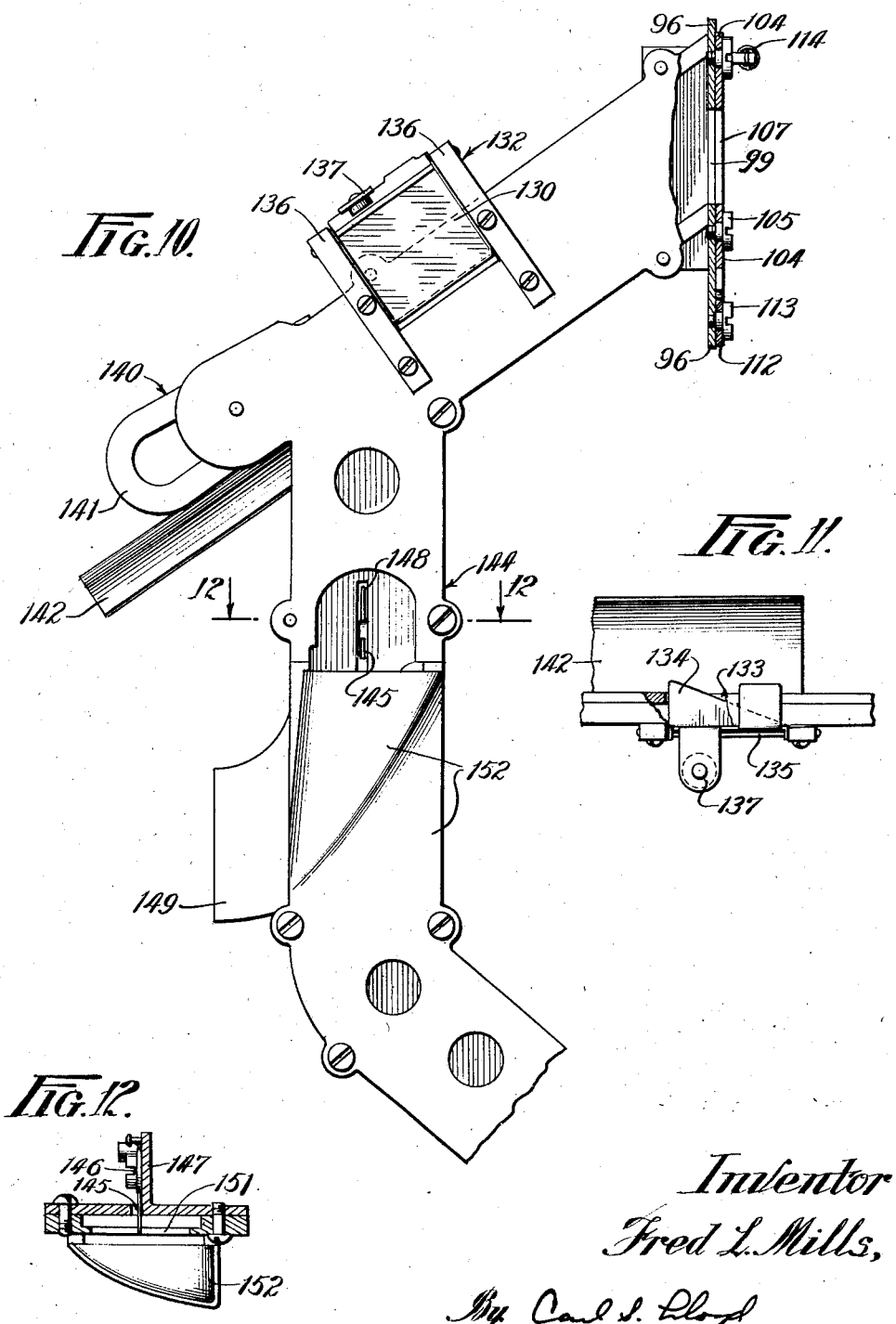

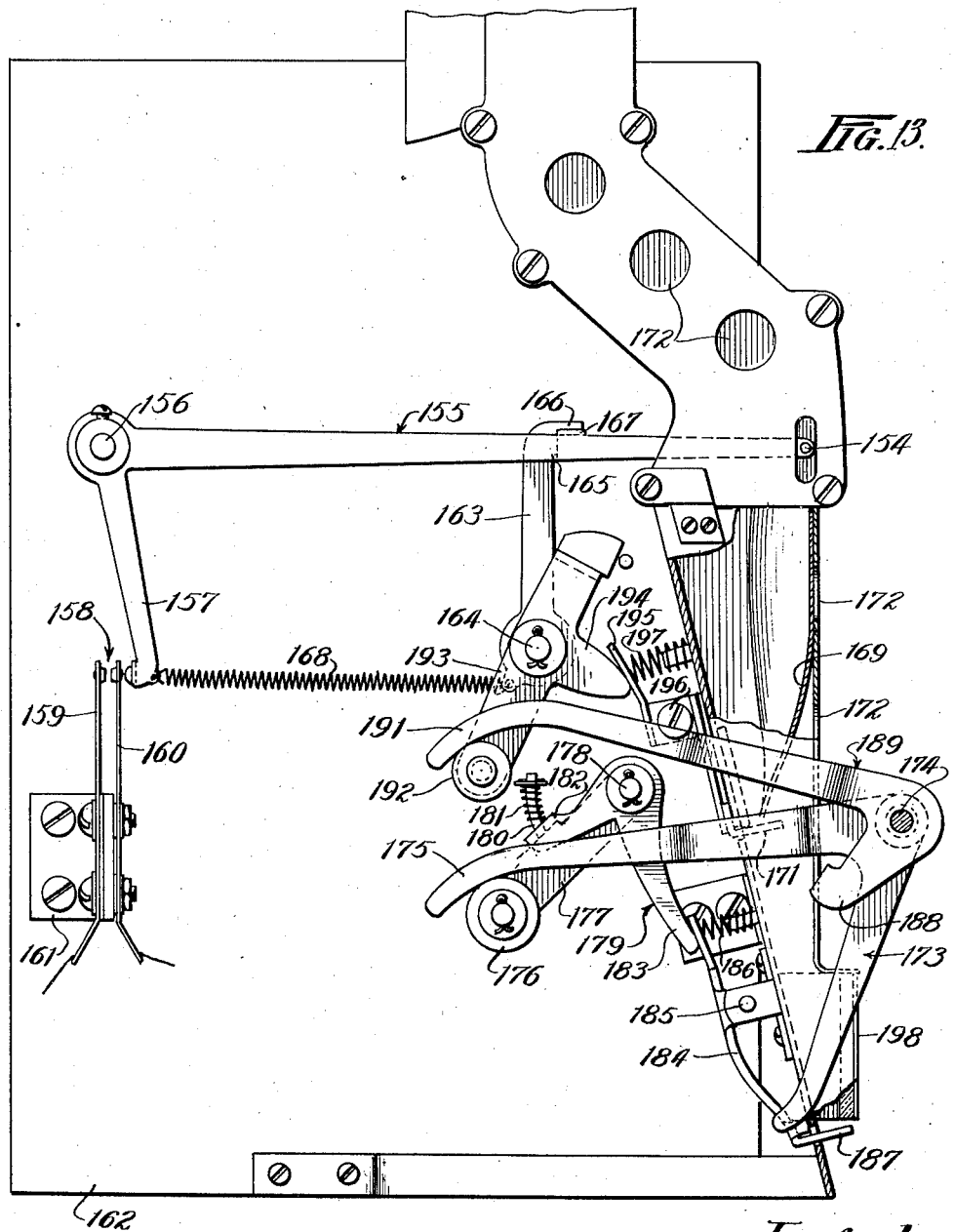

July 31, 1934.  F. L. MILLS  1,968,500
COMMODITY VENDING MACHINE
Filed April 10, 1930    12 Sheets-Sheet 9
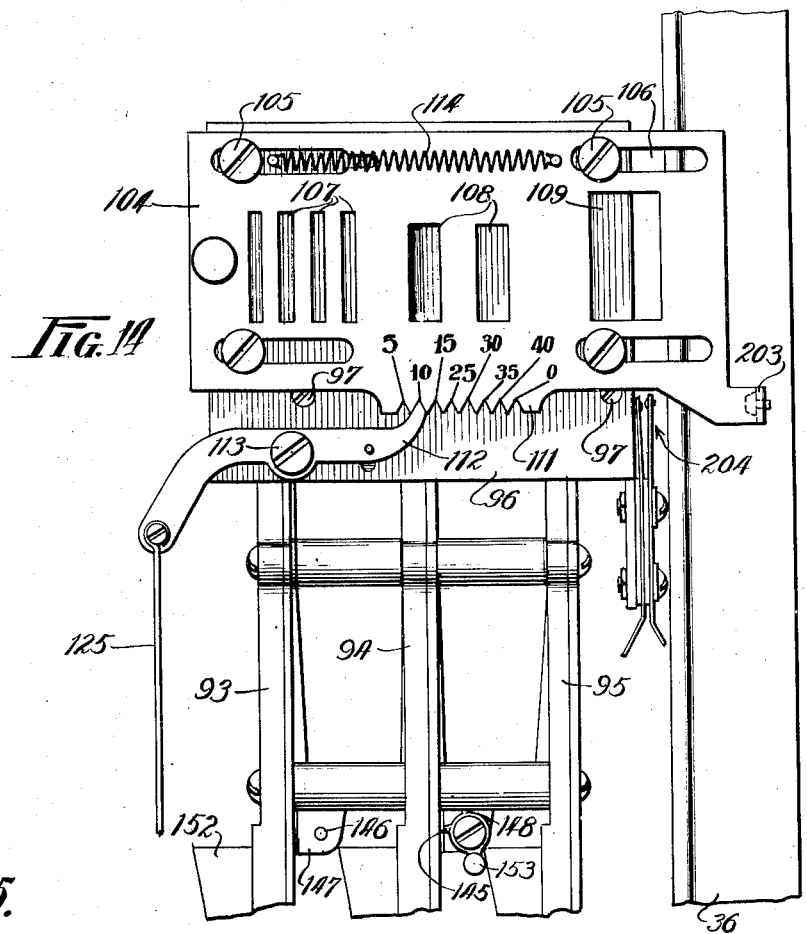
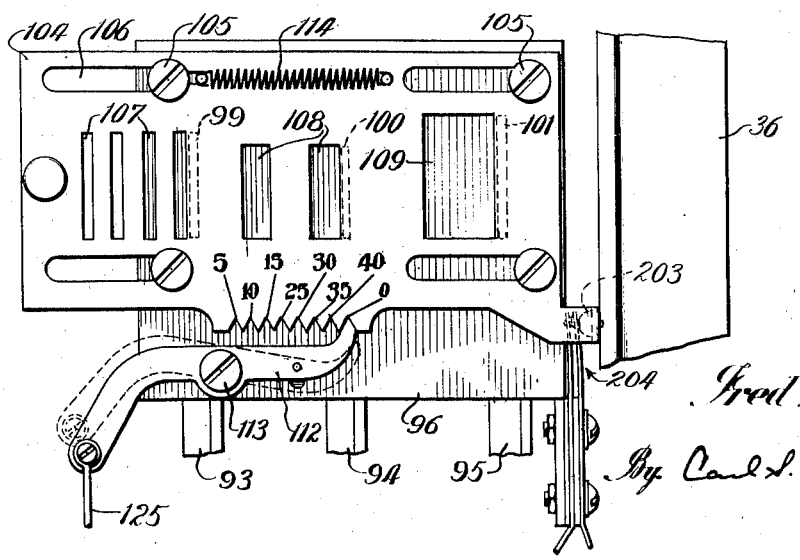
Inventor:
Fred L. Mills,
By Carl S. Lloyd
Atty.

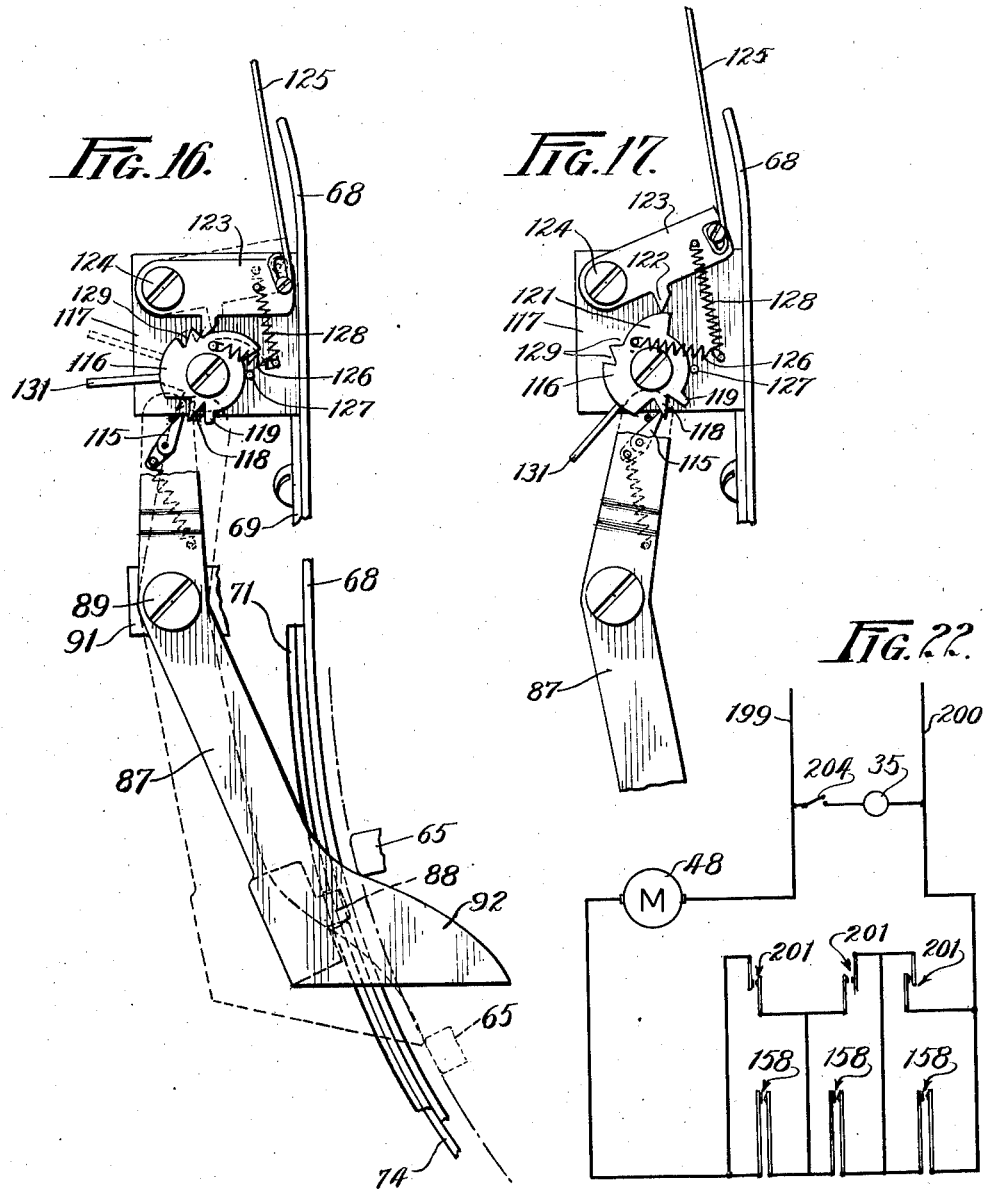

July 31, 1934.  F. L. MILLS  1,968,500
COMMODITY VENDING MACHINE
Filed April 10, 1930  12 Sheets-Sheet 11
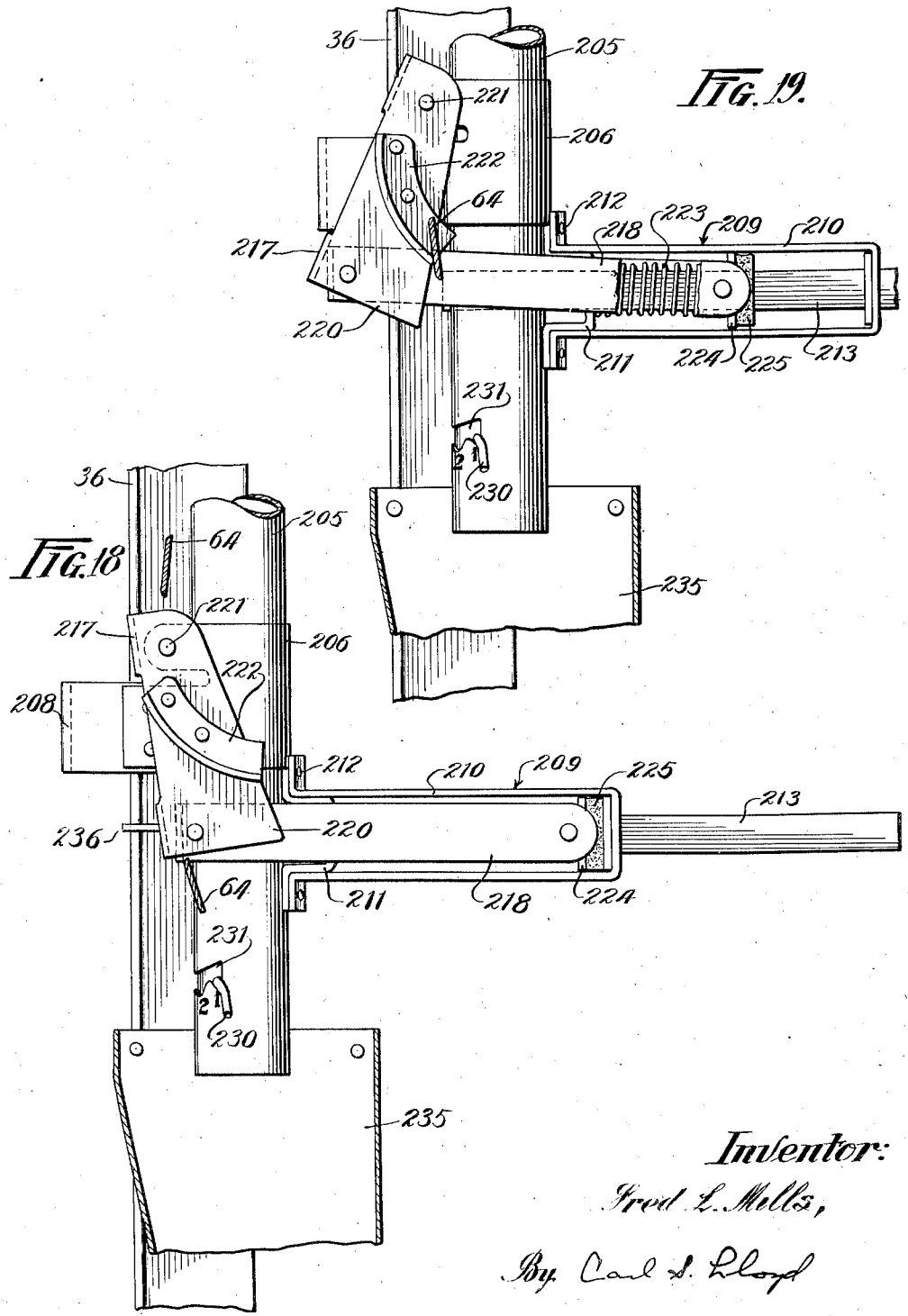

July 31, 1934.                F. L. MILLS                1,968,500
                        COMMODITY VENDING MACHINE
                        Filed April 10, 1930        12 Sheets-Sheet 12
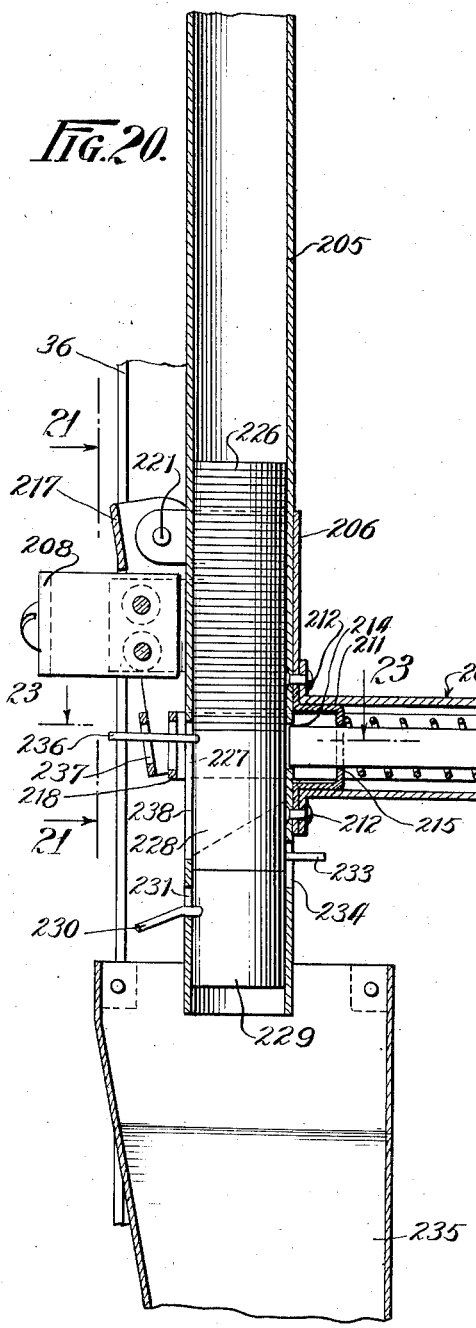
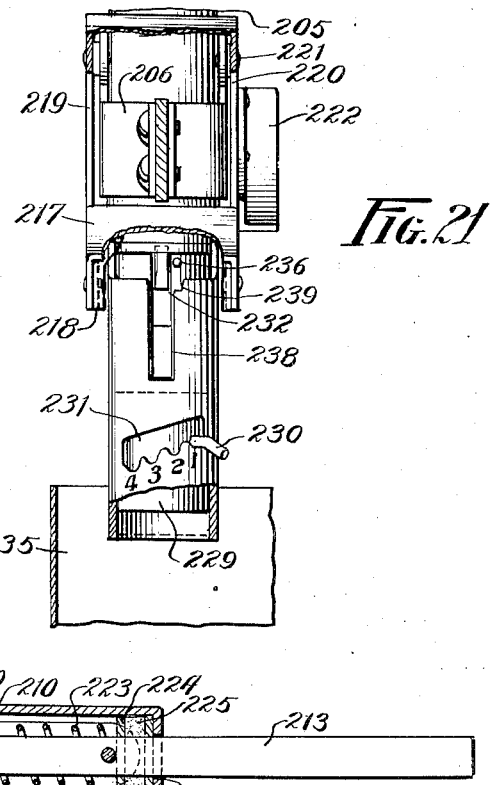
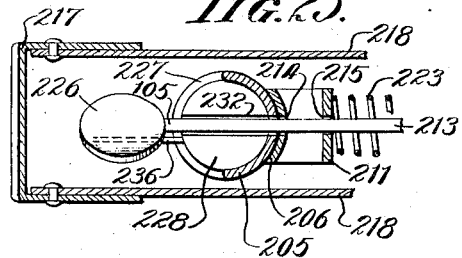
Inventor:
Fred L. Mills,
By Carl S. Lloyd
                Atty Patented July 31, 1934

1,968,500

UNITED STATES PATENT OFFICE 1,968,500

COMMODITY VENDING MACHINE

Fred L. Mills, Oak Park, Ill., assignor to Mills Novelty Company, Chicago, Ill., a corporation of Illinois Application April 10, 1930, Serial No. 443,029

43 Claims. (Cl. 194—10)

This invention relates to vending machines of the type particularly adapted for vending staple commodities such as groceries, and the like, which now are ordinarily sold over the counter by store attendants or clerks.

An important object of the invention is to provide a machine of this character which will vend the commodities in convenient sized packages and which will, in conjunction with the vending operation, give the necessary change which may be required.

Another object of the invention is to provide a machine of the kind described which is highly flexible in that it may be adjusted to accommodate different kinds of commodities, or different quantities of the same commodity, the purchases of these different kinds or amounts requiring, in certain instances, the combined use of coins of different denominations.

Another object of the invention is to provide a machine of this character in which means are provided for preventing the operation of the machine by the customer after all of contents have been sold.

Another object of the invention is to provide a machine of this class in which the individual vending units are of such construction that several of them may be removably positioned within a display cabinet, the cabinet being designed to permit of ready access to the several vending units when refilling is required.

A further object of the invention is to provide a machine of the class referred to which has reasonably large capacity so that a sufficient number of packages may be stored in the machine to eliminate the need of frequent refilling.

A still further object of the invention is the provision of a highly flexible machine of the class referred to in which the vending mechanism, the coin mechanism, and the change-making devices are variable or adjustable so as to adapt the machine to the vending of various commodities at various prices.

Further objects and advantages of the invention will be apparent as I proceed with my specification, which, taken in connection with the accompanying drawings discloses a preferred embodiment thereof.

Referring to the drawings:

Fig. 4 is an enlarged section taken on the line 4—4 of Fig. 3;

Fig. 5 is a fragmentary view showing the connection between the driving sprocket and the main drive shaft;

Fig. 6 is a broken section taken on the line 6—6 of Fig. 3;

Fig. 7 is a broken section taken on the line 7—7 of Fig. 6;

Fig. 8 is a top plan view of one of the cup or bucket containers for holding the packages or material to be vended;

Fig. 9 is a section taken on the line 9—9 of Fig. 8;

Fig. 10 is a broken elevational view, partly in section, showing one of the coin chutes;

Fig. 11 is a detail view of the small coin detecting station;

Fig. 12 is a section taken on the line 12—12 of Fig. 10 showing the station for detecting slugs or checks of the commonly used type which have holes in the center thereof;

Fig. 13 is an enlarged view, partly in section, showing the coin-operated mechanism for controlling the movement of the bucket conveyor;

Fig. 14 is a front view taken as indicated by the line 14—14 of Fig. 2 showing the upper end of the coin chutes and the mask plate for covering the coin slots;

Fig. 15 is a view corresponding to Fig. 14 showing the position assumed by the mask plate when the machine is empty;

Fig. 16 is a view showing the mechanism for controlling the package releasing slide and also the mechanism for releasing the mask plate;

Fig. 17 is a view corresponding to Fig. 16 showing the actuated position of the mask plate releasing means;

Fig. 18 is a broken elevational view, partly in section, of the change-making mechanism;

Fig. 19 is a view similar to Fig. 18 showing the actuated position of the change-making mechanism;

Fig. 20 is a section showing the change-making mechanism, the section being taken on the line 20—20 of Fig. 3;

Fig. 21 is a section showing said change-making mechanism from another angle, the section being taken substantially on the line 21—21 of Fig. 20;

Fig. 22 is a wiring diagram of the bucket conveyor motor circuit; and

Fig. 23 is a section taken on the line 23—23 of Fig. 20.

Figure 1:
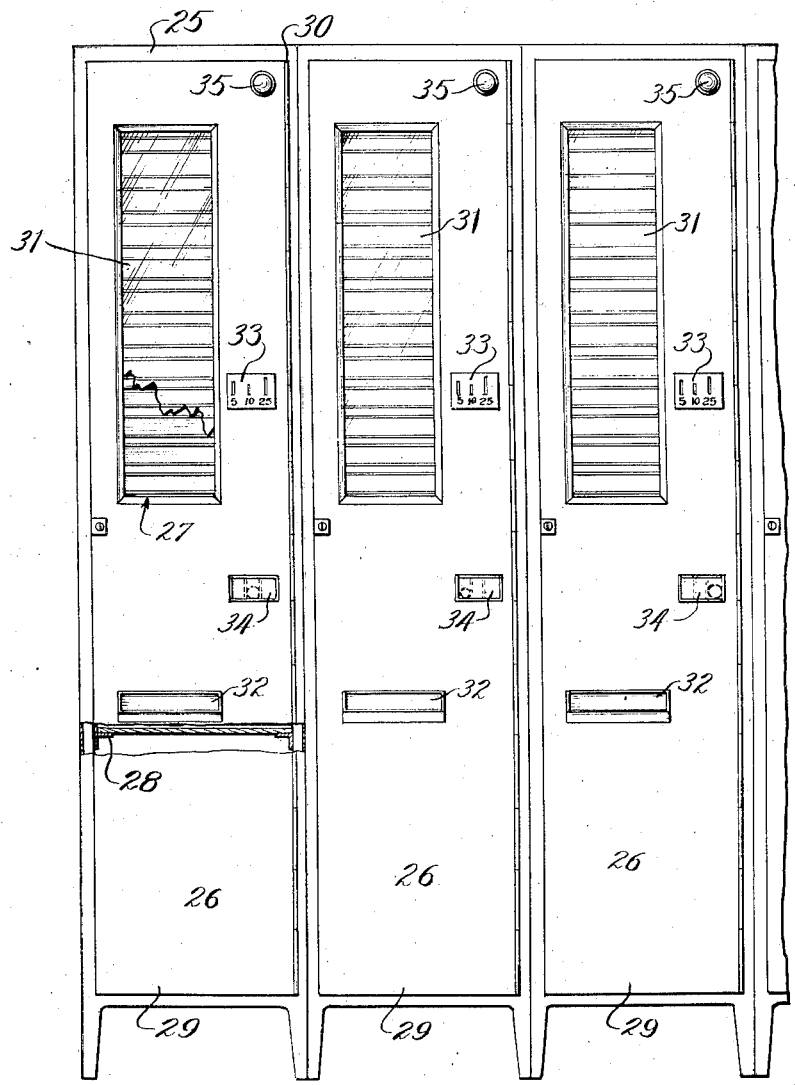
Fig. 1 is a front elevational view of a vending display cabinet containing individual compartments or lockers within which the several vending units are mounted.

The apparatus shown in the drawings, which is to be considered as merely an illustrative embodiment of the invention, may be mounted in a display cabinet 25 containing a series of lockers 26 each of which is adapted to contain one of the commodity vending units. The vending units, designated generally by the numeral 27, may be mounted in the lockers on suitable bracket supports 28 which are bolted or otherwise secured to the walls of the locker chambers. The lockers or compartments 26 are provided with doors 29 which are hinged as indicated at 30 to the vertical members of the locker frame. Said doors 29 are provided with glass panels 31 through which the packages contained in the vending units may be seen by the customer, and are also provided with delivery chute openings 32 which register with corresponding delivery chutes (hereinafter mentioned) of the several vending units. The doors 29 also contain coin slot panels 33 which register with coin slots, to be later described, of the corresponding vending units. The doors 29 also may be provided with glass panels 34 for viewing the coins inserted when they have come to a position of rest after passing through the upper portion of the coin chutes. Signal lights 35 may be mounted in the upper portion of the locker doors, and, as will hereinafter appear, are automatically turned on when the machine becomes empty.

The several vending units 27 are of the same construction and therefore only a single unit will be referred to in describing the invention.

Figure 2:
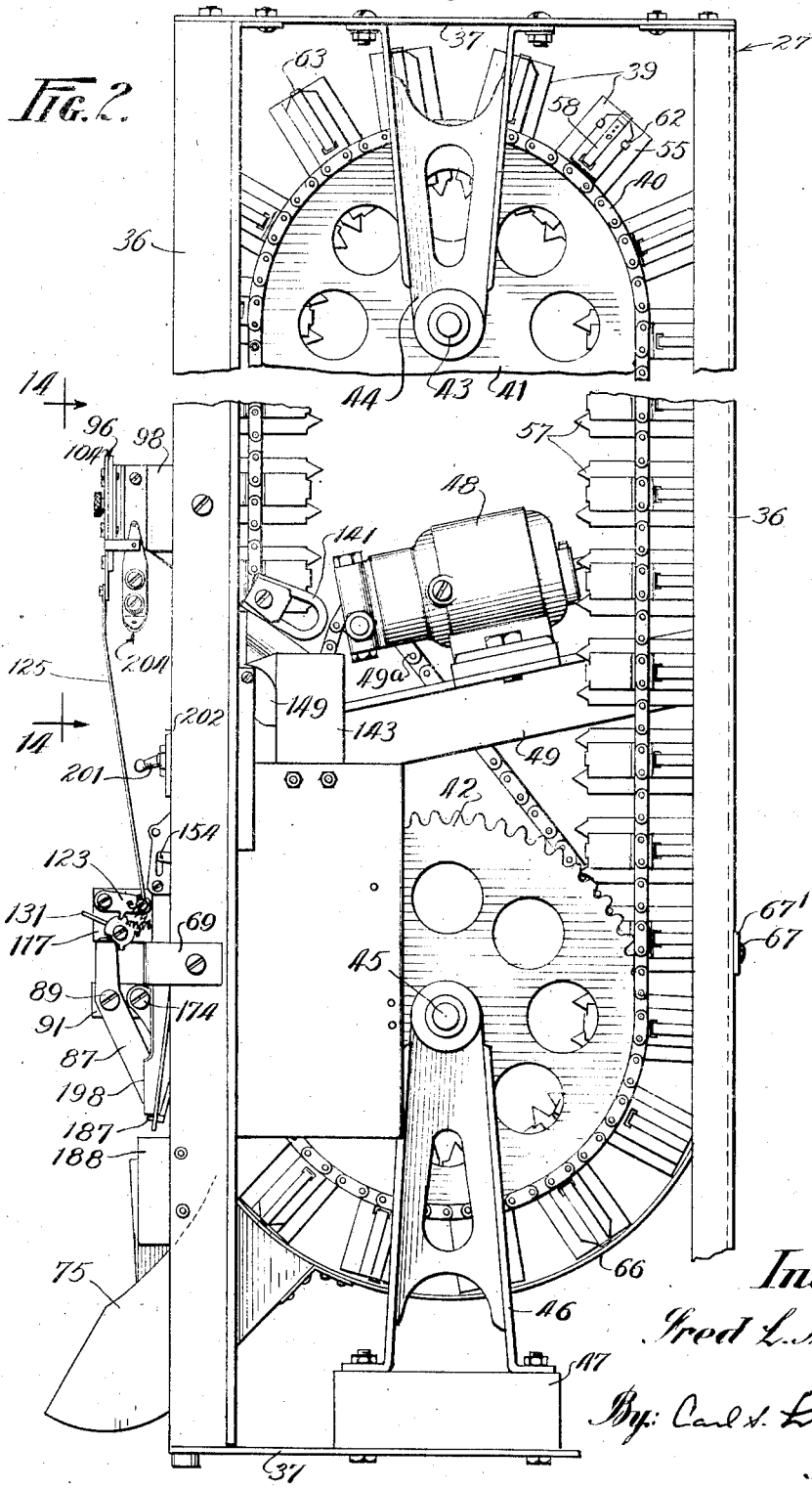
Fig. 2 is a side elevational view of one of the vending units, the unit being shown removed from the display cabinet.
Figure 3:
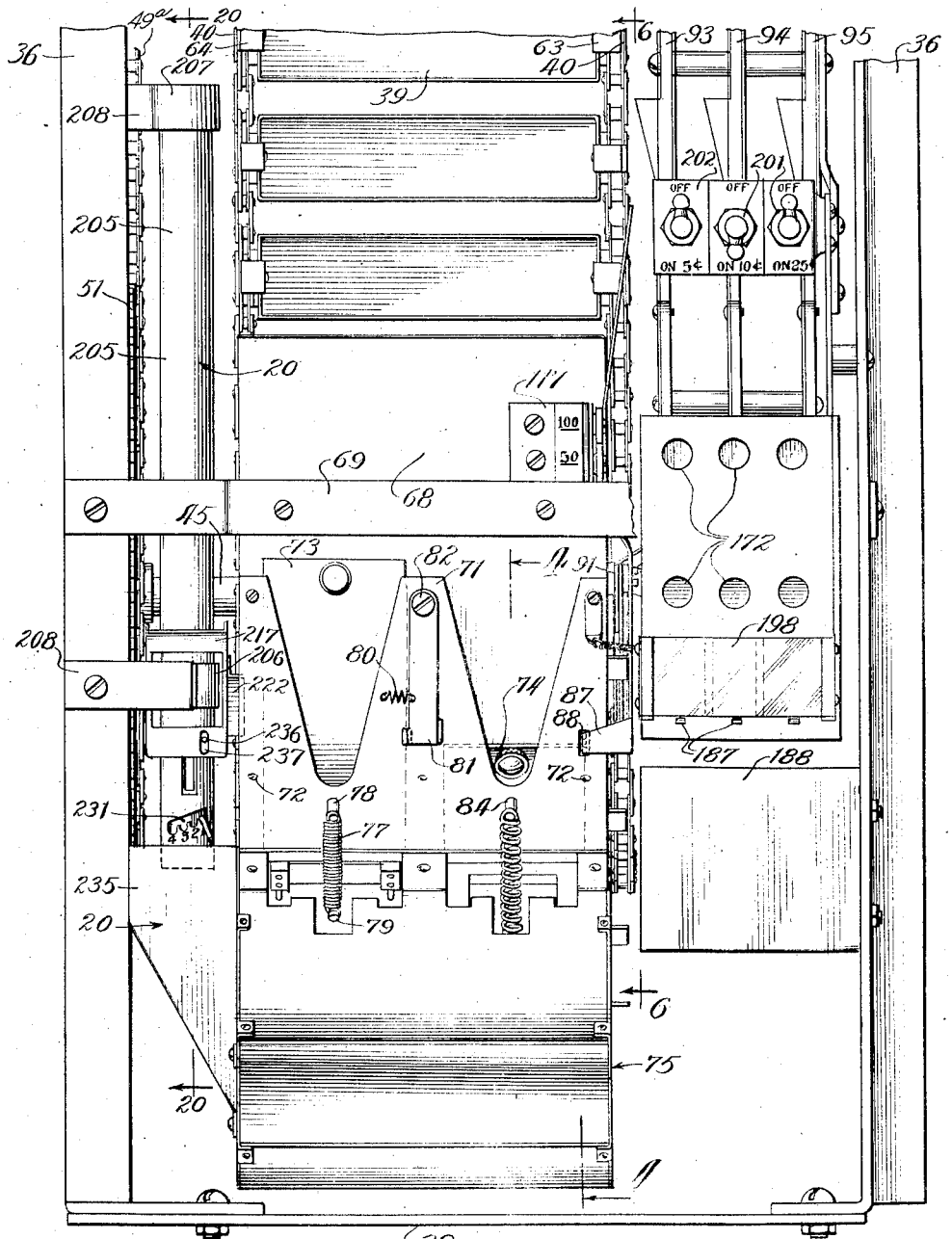
Fig. 3 is a front view of the lower portion of one of the vending units.

Referring to Figs. 2 and 3, it will be noted that the vending unit 27 is mounted in a box-shaped frame consisting of four vertical bars 36 which are connected at their opposite ends by cross-bars 37, extending from the front to the rear of the unit, and cross-bars 38 extending transversely or across the unit. These frame parts are suitably bolted together to form a rigid supporting frame. A series of buckets or box-like containers 39 are supported in spaced relation upon a pair of endless chains 40 which take over spaced idler sprockets 41 positioned at the upper end of the frame and spaced drive sprockets 42 positioned near the bottom of the frame. The buckets supported in this manner form, in effect, an endless carrier or conveyor. In the embodiment shown the unit has fifty buckets. The sprockets 41 are secured to a shaft 43 which is journaled at its opposite ends in a pair of brackets 44 which are bolted to the cross-members 37 at the top of the frame. As will presently appear, drive sprockets 42 have a ratchet and pawl connection with a drive shaft 45 which is journaled at its opposite ends in a pair of uprights 46 which are bolted to blocks 47, said blocks 47 being in turn bolted to the cross-members 37 at the bottom of the frame. The bucket carrying chains 40 are driven by a motor 48 mounted on a cross-bar 49 which is secured to the vertical frame members 36. The armature of the motor 48 is geared to a toothed wheel which engages the links of a drive chain 49<sup>a</sup> which takes over a sprocket drive wheel 51 (Fig. 3) secured to the drive shaft 45.

Referring now to Fig. 5, it will be seen that the sprockets 42 have a ratchet and pawl connection with the drive shaft 45, the ratchets 52 being carried by the drive shaft 45 and the pawls 53 being pivotally secured at 54 to the webs of said sprockets 42. This pawl and ratchet connection between the sprocket wheels 42 and the drive shaft 45 affords a positive drive for moving the bucket conveyor in a counterclockwise direction, viewing Fig. 2, and also affords a slip connection whereby the conveyor may be moved by hand to permit the refilling of the buckets 39 by allowing the operator to move the chains until all the buckets have passed a point from which they may be filled.

Referring next to Figs. 8 and 9, the buckets 39 are suspended between the carrier chains 40 by means of plates 55 which are off-set as shown at 56, the off-set portion forming the inner face of every fifth link of said chains 40. Said plates 55 are joined at their inner ends by integral strips 50 which engage the bottom wall of the buckets 39. The end walls of said buckets 39 are provided with spaced prongs 57, which serve as guides for centering the strips 50 across the bottom walls of the buckets. These prongs may be formed by stamping V-sections from the bottom walls of the buckets, as indicated at 57<sup>1</sup> in Fig. 8, and then bending them outwardly until they are flush with the end walls of the buckets. The plates 55 are provided with resilient latch arms 58 which are crimped inwardly near their free ends, the crimped or bent portions thereof extending through apertures 59 in the plates 55 and registering apertures 61 in the end walls of the buckets 39. The end walls of said buckets 39 are provided with spaced ears 62 which engage the opposite sides of the plates 55 to afford a sliding support between said plates 55 and the opposite ends of the buckets 39. These ears may be formed by stamping out portions from the bucket walls as shown in Fig. 8. The buckets are thus removably suspended between the carrier chains 40 and are positioned thereon with their open faces extending outwardly and substantially parallel to the plane of said carrier chains. Each of the buckets 39 is provided with laterally extending cam plates or lugs 63 and 64. As will hereinafter appear the lugs 63 actuate the coin operated control mechanism, and the lugs 64 actuate the change-making mechanism. One of the end plates 55 of the series is also provided with a cam bracket 65, which as will hereinafter appear, actuates the package releasing slide or gate and the mask plate which covers the coin slots.

Packages 60, (Fig. 4) containing food products or other merchandise, are placed in the conveyor buckets, and are dispensed therefrom as the buckets are successively presented to a discharge port. Referring to Figs. 3 and 4, a curved guard plate 66 secured at its rear edge, as shown at 67, (Fig. 4) to a transverse bar 67<sup>1</sup> extending between the two rearmost vertical frame members 36, prevents packages from falling from the buckets 39 at the bottom of the run of the conveyor and a front guard plate 68, secured along its front edge to a cross-bar 69 which extends between the front vertical members 36, extends downwardly and is curved inwardly toward its lower edge to conform to the arcuate path followed by the buckets 39. A guide plate 71 overlaps the lower edge of the plate 68 and is secured thereto by bolts 72, suitable washers or gaskets being interposed between these two plates to afford space for sliding gates 73 and 74. A discharge chute 75 is interposed between the forward edge of the curved guard plate 66 and the lower edge of the plate 68, the intervening open space or port 76 between these plates affording a discharge passage through which packages or other contents of the buckets 39 may be delivered to the purchaser, who has access thereto through the openings 32. The sliding gates 73 and 74 are freely movable between the guide plate 71 and the plate 68 and each is adapted to close approximately one-half of the discharge port 76, the separate gates being provided for a purpose which will presently appear.

The gate 73 is normally held in the open position, shown in Figs. 3 and 4, and is closed only to permit re-loading of the buckets. A coil spring 77, secured at its upper end to a pin 78 mounted on the guide plate 71 and at its lower end to a pin 79 secured to the lower end of said gate 73, urges the gate 73 upwardly toward the open position. Said gate 73 may be held in the closed position by a latch arm 81, which is pivoted at 82 to the guide plate 71, and is adapted to engage the upper edge of the gate 73 to hold it in closed position during the loading period. When the latch arm 81 is moved to the right (viewing Fig. 3) against the tension of a spring 80, the gate 73 is returned to the open position by the spring 77.

The gate 74, which is shown in the closed position in Fig. 3, is similar to the gate 73, being urged from closed to open position by a spring 83 which is secured at one end to a pin 84 carried by the guide plate 71 and at the other end to a pin 85 secured to the lower end of the gate 74.

If it is desired to dispense packages which are about equal in length to the width of the buckets 39, the gate 74 need not be closed. The machine, however, may be adapted for packages equal in length to half the breadth of the buckets 39 by inserting folded sheet metal separators 86 (Figs. 8 and 9) in the buckets which afford a removable partition dividing the bucket in two compartments. When using the double compartment it is necessary to close either the gate 73 or the gate 74 to prevent two packages from falling at one time as the buckets pass the outlet opening 76. The gate 74, in this instance, is kept closed during the first complete revolution of the conveyor, during which interval the packages are delivered from the compartment sections which pass over the gate 73. The gate 74 is then opened by the release of a pivoted latch arm 87, the inner end of which carries a lug 88 (Fig. 16) which extends through an aperture in the guide plate 71 and engages the top edge of the gate 74.

Referring particularly to Figs. 6 and 16, it will be observed that the latch arm 87 is pivoted at 89 to a bracket 91 which is secured to the front guard plate 68. The lower end of the latch arm 87 is curved as indicated at 92, the curved portion thereof extending into the path of the cam bracket 65. As previously noted, only one of the plates 55 is provided with a cam bracket 65, so that the latch arm 87 will be released only once for each revolution of the conveyor. The action of the cam bracket 65 on the lower end of the latch arm 87 will be apparent from Fig. 16 which shows how the arm is pivoted from the latched position shown in solid lines to the unlatched position shown in dotted lines. As the latch arm 87 is tripped by the cam bracket 65, the gate 74 is opened under the action of the spring 83, and the second series of packages may then be delivered. During the first revolution of the conveyor the packages are dispensed from the bucket compartments which pass under the gate 73. It will be apparent, therefore, that by using the removable dividing partition 86 and the gate 74, the capacity of the machine is doubled at least as to the number of packages which may be sold before a refill is necessary. As will subsequently appear in the description of the coin control mechanism, the tripping of the latch member 87 by the cam bracket 65 also actuates a mask plate which closes the coin slots to prevent operation of the machine after all of the packages have been vended.

In the embodiment shown, the vending units are designed to vend packages ranging in price from one to forty cents inclusive, with the exception of the interval from sixteen to twenty cents. To this end I provide three coin slots for taking, individually, a nickel, a dime, and a quarter, and in conjunction therewith change-making mechanism for delivering from one to four pennies, depending upon the price of the articles to be vended. The coin slots, collectively, are designed to accommodate any combination of the three coins mentioned, and the change-making mechanism is adjustable to reach the intervening prices which cannot be exactly reached by any combination of the nickel, dime, and quarter coins.

Referring to Figs. 14 and 15, three coin chutes 93, 94 and 95, adapted to receive a nickel, a dime, and a quarter, respectively, are secured at their upper ends to a plate 96 which in turn is secured by bolts 97 to a bracket 98 (Fig. 2) which is carried by one of the vertical frame members 36. The plate 96 is provided with coin slots 99, 100, and 101 for receiving a nickel, a dime, and a quarter, respectively, the slots being positioned to register with the upper ends of the coin chutes 93, 94 and 95, respectively. A mask plate 104 is slidably mounted on the plate 96 by screws 105 which extend through slots 106 formed in the plate 104. Said mask plate is provided with nickel, dime, and quarter slots which are positioned so as to register with any one or any desired combination of the slots 99, 100 and 101. In the illustration shown the mask plate is provided with four nickel slots 107, two dime slots 108, which are somewhat wider than the dime slot 100 in the plate 96, and one quarter slot 109, which is considerably wider than the quarter slot 101 in the plate 96. The lower edge of the mask plate is provided with a toothed rack 111 having seven notches, corresponding to the multiples of five between five and forty, except twenty, and one notch representing the value of zero. A pawl 112, pivoted at 113 to the plate 96, engages the teeth on the rack 107 and holds the mask plate at a given setting. When the pawl 112 is moved into the position shown by the dotted lines in Fig. 15, the mask plate 104 is shifted by a coil spring 114 to the closed position shown in Fig. 15 in which position all of the coin slots in the plate 96 are covered.

It will be apparent that by properly apportioning the widths of the slots 107, 108, and 109, the desired slot or slots in the plate 96 may be uncovered. In the position shown in Fig. 14 the pawl 112 is set in the dime notch and the corresponding dime slot in the plate 96 is opened, the nickel and quarter slots being closed.

The movement of the pawl 112 is controlled by the movement of the latch member 87 which, as previously explained, is actuated once during each revolution of the conveyor by the cam bracket 65.

Referring now to Figs. 16 and 17, it will be seen that the upper end of the latch arm 87 carries a pawl 115 which engages the teeth of a ratchet cam 116 which is pivotally mounted on a bracket 117, said bracket being secured to the guard plate 68. The ratchet cam 116 is provided with teeth 118, 119 which engage the pawl 115. It is also provided with a cam tooth 121 which engages a prong 122 carried by a link 123 which is pivoted at 124 to the bracket 117. The free end of the link 123 is pivotally connected to a rod 125, the upper end of which connects with the pawl 112 on the plate 96. A coil spring 126 urges the cam tooth 121 towards a stop 127, and a coil spring 128 normally holds the prong 122 in one or the other of the notches 129 in the ratchet cam 116. The ratchet cam 116 is provided with an arm 131 which may be set in one position, represented by the solid lines in Fig. 16, and in a second position represented by the dotted lines in Fig. 16.

In the position represented by the solid lines in Fig. 16 the arm 131 is opposite an index numeral 50 on the bracket 117 (Fig. 3). In this position a single actuation of the latch arm 87 will raise the link 123 and release the pawl 112 which in turn allows the mask plate 104 to close. In the position represented by the dotted lines in Fig. 16 the arm 131 is opposite an index number 100 on the bracket 117 and two actuations of the latch arm 87 will be required before the link 123 is raised to release the pawl 112. The mask plate 104 will therefore be released either after one complete revolution of the conveyor or after two revolutions of the conveyor depending upon whether the buckets 39 contain one or two packages each. It will be understood that when the dividing partitions 86 are not employed, so that each bucket contains but a single package, the arm 131 will be set at the index number 50 and the mask plate will be automatically closed after one complete revolution of the conveyor.

The coin chutes 93, 94, and 95 are of similar construction, except for the kind of coins they are adapted to receive, and therefore only the nickel chute 93 will be described, reference being had in this connection to Figs. 10–12. The coin upon being introduced into the coin chute first passes a small-coin detecting station 132, a top plan view of which is shown in Fig. 11. If the coin is under-size it will be deflected through a slot 133 by a cam plate 134 which is carried on the lower edge of a swinging plate 130, said plate 130 being pivoted on a shaft 135, the opposite ends of which are journaled in supporting arms 136. The plate 130 is provided with a counter-balance weight 137 and the member 134 is biased so that it will eject under-size coins but will be moved out of the way by coins of proper size. After the coin passes the station 132 it comes to an iron slug detecting station 140 where a magnet 141 withdraws any iron or steel slugs in the well known manner. The coins removed at the stations 132 and 140 are carried away by a chute 142 to a suitable receptacle 143 (Fig. 2).

The coin next drops to a station 144 for detecting coins or checks with holes in the center thereof. A section of the station is shown in Fig. 12 from which it will be seen that the coin strikes an arm 145 which is pivoted at 146 to a bracket 147 extending laterally from the side wall of the chute. A second arm 148 (Fig. 10) of a length sufficient to strike a coin substantially in the center turns with the arm 145. If the coin has a hole in the center it is not disturbed, and drops into a discharge chute 149 which carries it to the receptacle 143. If the coin has no hole in the center it is shoved laterally by the pin 148 through a slot 151 into an offset chute 152 which conducts it to the switch control mechanism to be later described. A counter-weight 153 (Fig. 14) turns the pins 145 and 148 back to normal position after a coin has been passed.

The nickel, dime, and quarter coin chutes are each provided with switch mechanism for controlling the motor 48 and are selectively interconnected so that the motor will not be started unless or until the required coins are inserted. Referring to Figs. 6 and 13, the coin after leaving the last detecting station just described, drops into engagement with a pin 154 which is carried on a switch lever 155 and extends laterally from the end thereof into the coin chute. The lever 155 is fulcrumed on a shaft 156 and is provided with a short arm 157, the lower end of which is positioned adjacent a switch 158, said switch consisting of a pair of spring contact arms 159 and 160 which are mounted in spaced-apart relation on an insulation block 161, which in turn is supported on a plate 162, the latter forming part of the housing for the lower end of the coin chutes. When a coin strikes the pin 154 the lever 155 is turned and the switch 158 is closed.

A latch arm 163 is mounted on a shaft 164 which extends laterally from the plate 162, said latch arm being provided at its upper end with a notch 165 and a laterally extending prong 166. The long arm of the switch lever 155 is provided with a laterally extending lug 167 which is adapted to engage either the notch 165 or the prong 166. A coil spring 168, secured at one end to the arm 157 and at the other end to the latch arm 163, urges the latch arm 163 in a clockwise direction, viewing Fig. 13, so that when the switch lever 155 is turned by the coin it is latched by the arm 163 and the switch 158 remains closed.

After the coin passes the pin 154 it is turned by an apron 169 and momentarily comes to a position of rest on a shelf-like projection 171. The front and side walls of the coin chute housing may be provided with apertures 172 through which a small tool may be inserted to dislodge coins in case the chutes become clogged.

As will hereinafter appear, closing of one of the switches 158 does not necessarily start movement of the conveyor. A switch 158 is provided for each chute and the conveyor motor does not start until the proper coin or combination of the coins has been inserted.

As soon as the bucket conveyor starts to move, one of the lugs 63 on the buckets 39 engages the lower end of a trip lever 173 which is fulcrumed at 174 on the bracket 91. The lever 173 includes an inwardly extending arm 175 which engages a roller 176 carried by an arm 177, said arm being pivotally mounted on a pin 178 carried by the plate 162. A lever 179 is carried by the pin 178 and has a yielding connection with the arm 177 through a spring 181 mounted on a stud 180 on the arm 177 and having engagement with the short arm 182 of the lever 179. The long arm 183 of the lever 179 engages a gang lever 184 which is pivoted at 185 to a bracket supported on the inner wall of the coin chute. The upper end of the gang lever 184 is forced inwardly against the lower end of the arm 183 by a coil spring 186, and the lower end of said gang lever is turned outwardly to afford a shelf-like projection 187 for engaging the coin after it has been dropped from the shelf 171. As the trip lever 173 pivots in a counter-clockwise direction, viewing Fig. 13, under the action of the lug 63, the gang lever 184 is pivoted in a clockwise direction through the action of the lever 179, and the coin-supporting shelf 187 is withdrawn, whereupon the coins previously used to actuate the machine are dropped into a coin box 188 (Fig. 3). The gang lever 184 extends laterally across the lower end of all three of the coin chutes and is provided with three coin supporting shelves 187 which support the coins which have been inserted in the nickel, dime, and quarter slots.

Shortly after the coins previously inserted have been dropped by the tripping of the gang lever 184, the lug 63 on the next bucket engages the short arm 188 of a second trip lever 189 which is also pivoted at 174. An arm 191 of the lever 189 extends inwardly and engages a roller 192 which is carried on the lower end of a cam lever 193, said cam lever being pivoted on the shaft 164 and adapted to turn with the latch arm 163. The cam lever 193 carries a cam arm 194 which engages a gang lever 195, said gang lever being pivoted at 196 to a bracket carried by the inner wall of the coin chute. The lower end of the gang lever 195 carries the coin rest 171 which holds the newly introduced coins until the conveyor starts up and releases the previously used coin from the shelf 187. The upper end of said gang lever is held against the cam arm 194 by a coil spring 197. When the trip lever 189 is actuated by the lug 63 on one of the buckets 39 the shelf 171 is drawn inwardly through the action of the cam lever 193 and the coin is dropped to the shelf 187. Since the cam lever 193 and the latch arm 163 turn together, the actuation of the lever 189 likewise releases the switch lever 155 from the latch arm 163 which in turn opens the switch 158 and stops the conveyor. The gang lever 195 is similar in construction to the gang lever 184, and is provided with three of the coin rests 171 which extend into the nickel, dime, and quarter slots and which are moved as a unit by the cam lever 193. The front wall of the coin chute housing is provided with a glass plate 198 for viewing the coins which rest on the shelves 187. It will thus be seen that after the coins have come to rest on the shelves 187 they may be viewed through the window 34 and remain in this position until the next operation is begun. This is a very effective deterrent to the use of slugs, since the proprietor and others in the store can tell after a customer has operated the machine whether he has used slugs or not.

As previously stated, each of the three coin chutes is provided with a switch lever 155 and a conveyor motor switch 158. These three switches are interconnected so that the conveyor motor 48 will not be started unless the required combination of coins is used.

A wiring diagram of the conveyor motor circuit is shown in Fig. 22, from which it will be seen that the motor 48 is fed from a main line wire 199 and the switches 158 are placed in series between the return side of the motor and the other main line wire 200. Each of the switches 158 may be short-circuited by hand-operated switches 201 which may be of the toggle type, as shown in Fig. 3. A switch plate 202 (Fig. 3), secured to the coin chutes, affords a mounting for said toggle switches 201. The plate is marked as shown to indicate the off-and-on positions of the switches and also to indicate the coin chutes to which the switches respectively correspond. Referring back to Fig. 22, when one of the toggle switches is closed a coin need not be inserted in the corresponding coin chute inasmuch as the motor switch 158 corresponding to that chute is then short-circuited. The toggle switches 201 are adjusted when the machine is filled and cannot be touched when the locker doors 29 are closed. For example, in selling an article of the value between twenty-five and thirty cents, which only requires the use of the nickel and quarter slots, the toggle switch 201 on the dime slot is closed. The conveyor motor 48 will then be started as soon as coins are placed in the nickel and quarter slots. If the machine is loaded with packages which sell between thirty-five and forty cents, which requires the use of all three chutes, all of the toggle switches 201 will be left open. This circuit arrangement makes it impossible for a customer to operate the machine until the proper combination of coins has been inserted. After the several coins required for a particular purchase are inserted, in any order whatever, they temporarily come to rest on the shelves 171, and when the last of the coins is inserted the motor circuit will be closed and the machine will start to operate.

Referring to Figs. 1, 14 and 22, the signal lights 35 are turned on when the machine is empty by the movement of the master plate 104, which carries an inwardly extending stud 203, said stud being positioned to close a signal light switch 204 when the master plate 104 is released and drawn to closed position by the spring 114. This switch is shown in the closed position in Fig. 15.

The machine is provided with change-making mechanism which, in the embodiment shown, will automatically deliver one to four pennies change, depending upon the value of the article purchased. Referring to Figs. 3 and 18–21 inclusive, the change-making mechanism comprises; a coin tube or magazine 205 which is supported in brackets 206 and 207, said brackets being bolted to arms 208 which are in turn fastened to one of the vertical members 36; and coin discharge mechanism 209 which is actuated by the lugs 64 on the buckets 39 and operable thereby to discharge a predetermined number of coins from the coin tube 205.

The coin discharge mechanism comprises; an elongated bearing bracket 210; a short bearing bracket 211, which is positioned at the base of the bracket 210, the two brackets being supported as a unit on the coin tube by rivets 212; a plunger 213 which extends through apertures 214, 215 and 216 which are provided in the coin tube 205, the bracket 211, and the bracket 210, respectively; and a cam actuator 217, including arms 218 for reciprocating the plunger 213.

The cam actuator 217 may consist of a stamped metal piece having spaced side members 219 and 220 which are pivotally supported at 221 on the coin tube supporting bracket 206. The inner side wall 220 carries a cam plate 222 which is disposed in the path of the studs 64 on the carrier buckets. The plunger arms 218 are pivotally connected at one end to the side walls 219 and 220 of the actuator 217, and are pivotally connected at their opposite ends to the plunger 213. A coil spring 223 is interposed between the bracket 211 and an end plate 224 carried by the plunger 213, said spring affording means for holding the plunger in the withdrawn position shown in Figs. 18 and 20. A piece of buffing material 225 carried by the plate 224 absorbs the shock on the return movement of the plunger.

The coin tube 205 is filled with a stack of pennies 226 which are discharged through a slot 227 by the plunger 213. The slot 227 is of sufficient width to allow as many as four pennies to be discharged at one time. An adjustable coin rest 228 is positioned in the lower end of the coin tube 205 and is supported on a plug 229 to which is attached an adjusting arm 230, said arm extending through a spiral slot 231 in the lower end of the coin tube. The slot 231 is provided with four notches for receiving the adjusting arm 230, the notches being numbered consecutively to indicate the number of coins to be discharged. When the adjusting arm is in the lowest notch the coin support 228 will allow four pennies to be discharged by the plunger 213. In the intermediate positions, 1, 2, and 3 coins will be discharged depending upon the position of plug 229. The coin rest 228 is slotted as shown at 232 to receive the plunger 213 and it is also provided with an aligning pin 233 which extends through a slot 234 in the coin tube 205. It will be apparent that when the lugs 64 on the buckets 39 move into engagement with the cam plate 222 the plunger 213 will be pushed inwardly as indicated in Fig. 19 and a predetermined number of coins from the stack 226 will be discharged through the slot 227. The discharged coins fall into a chute 235 which opens into the side of the main discharge chute 75 as shown in Figs. 3 and 4. The coil spring 223 withdraws the plunger 213 from the coin tube 205 after the lugs 64 have passed over the cam plate 222.

Referring to Fig. 23, the coin rest 228 carries a pin 236 which extends through the coin slot 227 and serves to tip the coins as they are pushed from the tube. This pin extends through a slot 237 in the lower front face of the cam actuator 217. As shown in Fig. 21 the coin tube 205 is provided with a vertical slot 238 for receiving the forward end of the plunger 213 and is also cut away as indicated at 239 to receive the pin 236 in its lowermost position.

The change-making mechanism just described is controlled by the movement of the conveyor buckets and therefore operates simultaneously with the package delivering mechanism. The purchaser, consequently, obtains a package and the necessary change by merely inserting the proper coins in the coin slots.

In the illustration shown, the change-making mechanism delivers from one to four pennies and therefore, accommodates the machine to prices which are not reached by combinations of a nickel, a dime, and a quarter. The interval from sixteen to twenty cents inclusive, however, is not reached by the embodiment shown, inasmuch as the machine, in this particular embodiment, will not take more than one coin of a given denomination, and the change-making mechanism is so adjusted that it does not deliver more than four pennies. If the price of the package is a multiple of five no change is necessary, and the coin tube 205 does not have to be filled when the machine is loaded.

While the operation of the machine will be apparent from the foregoing description, it is believed that a brief enumeration of the major steps in the operation will lead to a clearer understanding of the invention. Taking as an example a package which the grocer wishes to sell at a price of twenty-one cents, and further assuming that the package is of such size that two may be placed in one of the conveyor buckets 39 by the use of the dividers 86; the gates 73 and 74 are closed and the conveyor buckets are all filled by turning the conveyor chains 40 by hand against the slip connection afforded by the pawl and ratchet connection 52, 53 (Figs. 4 and 5). When the conveyor is filled it is left in such position that the cam bracket 65 will not engage the trip lever 87 until one full revolution has been completed. The filling operation obviously may be performed without removing the vending unit from the locker cabinet 26. The latch arm 81 is then released and the gate 73 is opened by the spring 77. The coin tube 205 is filled with pennies and the adjusting arm 230, attached to the coin rest supporting plug 229, is placed in the lowest notch corresponding to the number 4 which will permit the discharge of four pennies upon each actuation of the plunger 213. Two of the toggle switches 201 corresponding to the nickel and dime slots are turned to the "on" position which short-circuits the two motor switches 158 which are operated by the insertion of coins in the nickel and dime coin chutes. The toggle switch 201 corresponding to the quarter coin chute is turned to the "off" position so that the conveyor motor 48 will be started whenever a quarter is dropped in the quarter slot. The ratchet cam control arm 131 (Figs. 6, 16 and 17) is set in the position corresponding to the numeral 100 on the plate 117 (Fig. 3) since one hundred packages will be dispensed before the machine is empty, there being two packages in each conveyor bucket. The mask plate 104 (Figs. 14 and 15) is then set so that the pawl 112 is in the twenty-five cent notch on the rack 111. The filling and aforementioned adjusting operations being completed, the unit is ready for operation and the locker cabinet doors 29 may be closed and locked. The machine will thereupon sell one of the twenty-one cent packages each time that a quarter is inserted in the quarter slot and four pennies will be delivered to the customer together with each package purchased, the change-making mechanism being operated by the lugs 64 on the conveyor as hereinbefore described.

After the conveyor has made one complete revolution the cam bracket 65 (Fig. 6) actuates the trip lever 87 and releases the gate 74 which then allows the second series of fifty packages to be dispensed. As the last package is sold the cam bracket 65 actuates the trip lever 87 for the second time which through the ratchet cam 116 (Figs. 6, 16 and 17) releases the pawl 112 and allows the mask plate 104 to close, preventing further operation of the machine. The closing of the mask plate lights the signal light 35 which shows the attendant that the machine is empty.

The machine is highly flexible in nature inasmuch as it may be readily adapted to articles of various values and sizes. The units may be easily replaced or interchanged with other units in the cabinet, and the cabinet itself affords a convenient display case. The number and size of the buckets is largely a matter of choice, depending upon the class of trade in which the machine is to be used. It will be apparent that by multiplying the number of coin slots the flexibility of the machine may be increased to accommodate packages having even a greater range of values. It will be apparent, also, that by omitting from some of the buckets the cam lugs 63 and 64 the machine could easily be adapted to deliver several packages at a single purchase. Again, it will be obvious that by using several gates similar to gate 74, and providing the ratchet cam 116 with a corresponding number of notches, the machine could be made to vend several series of packages upon successive revolutions of the conveyor. All such modifications are to be viewed as fully within the scope of the invention.

The foregoing detailed description has been given for clearness of understanding only, and no unnecessary limitations should be understood therefrom, but the appended claims should be construed as broadly as permissible in view of the prior art.

What I regard as new and desire to secure by Letters Patent is:

1. In a commodity vending machine the combination of vending mechanism provided with means adapting it to the sale of commodities of different quantity or size; coin-operated mechanism for controlling the vending operations; a change-making device for delivering a predetermined amount of change upon each vending operation; means operated by the vending mechanism for actuating said change-making device; and means for setting said device to vary the amount of change to be delivered as the price of the commodity may require.

2. In a commodity vending machine the combination of vending mechanism provided with means adapting it to the sale of commodities of different quantity or size; coin-operated mechanism for controlling the vending operations; means for setting said mechanism to receive varying numbers of coins as may be necessary to the vending of commodities of different value; a change-making device for delivering a predetermined amount of change upon each vending operation; means operated by the vending mechanism for actuating said change-making device; and means for setting said device to vary the amount of change to be delivered as the price of the commodity may require.

3. In a commodity vending machine; a vending mechanism provided with means adapting it to the sale of commodities in varying quantity or package size; a variable coin device for operating said vending mechanism upon the introduction of a suitable coin or combination of coins; a variable change-making device for delivering change in proper amount according to the difference between the price of the commodity vended and the value of the coin or coins introduced, and means operated by the vending mechanism for actuating said change-making device.

4. In a commodity vending machine; a vending mechanism; a coin device for operating said vending mechanism; a change-making device for delivering change in predetermined amount; means operated by the vending mechanism for actuating said change-making device; means adapting said vending mechanism to the sale of commodities in varying quantity or package size; means for adjusting said coin device to cause operation of the vending mechanism upon the introduction of various coins or combinations of coins; and means for adjusting said change-making device to deliver change in proper amount according to the difference between the price of the commodity vended and the value of the coin or coins introduced.

5. In a commodity vending machine; a conveyor for dispensing articles of merchandise; means adapting said conveyor to the delivery of commodities in varying quantity or package size; a variable coin device for operating said conveyor upon the introduction of a suitable coin or combination of coins; and means operable to allow a series of articles to be dispensed from the machine during the initial revolution of the conveyor and a second series of articles therefrom upon an additional revolution of the conveyor.

6. In a commodity vending machine; a conveyor for dispensing articles of merchandise; means adapting said conveyor to the delivery of commodities in varying quantity or package size; a variable coin device for operating said conveyor upon the introduction of a suitable coin or combination of coins; a variable change-making device for delivering change in proper amount according to the difference between the price of the commodity vended and the value of the coin or coins introduced; means for actuating said device upon each operation of the vending mechanism and means operable to allow a series of articles to be dispensed from the machine during the initial revolution of the conveyor and a second series of articles therefrom upon an additional revolution of the conveyor.

7. In a commodity vending machine; a vending mechanism provided with means adapting it to the sale of commodities in varying quantity or package size; a variable coin device for operating said vending mechanism upon the introduction of a suitable coin or combination of coins; a variable change-making device for delivering change in proper amount according to the difference between the price of the commodity vended and the value of the coin or coins introduced; means for actuating said device upon each operation of the vending mechanism and means operated by the vending mechanism for preventing the introduction of coins into the machine after all of the merchandise has been dispensed therefrom.

8. In a commodity vending machine; a vending mechanism, including a conveyor and a series of merchandise containers adapted to be supported thereon; means for releasably securing said containers to the conveyor, said means being arranged to receive containers of different sizes, whereby to adapt the vending mechanism to the sale of commodities in varying quantity or package size; and a variable coin device for operating said vending mechanism upon the introduction of a suitable coin or combination of coins, said device comprising, a series of coin chutes provided with slots for the introduction of coins, coin-operated switches individual to said coin chutes, and manually-controlled switches acting in conjunction with said coin-operated switches to operate said vending mechanism upon the introduction of a coin in at least one of said coin chutes.

9. In a commodity vending machine; a vending mechanism provided with means adapting it to the sale of commodities in varying quantity or package size; a variable coin device for operating said vending mechanism upon the introduction of a suitable coin or combination of coins, said device comprising, a series of coin chutes provided with slots for the introduction of coins, coin-operated switches individual to said coin chutes, and manually-controlled switches acting in conjunction with said coin-operated switches to operate said vending mechanism upon the introduction of a coin in at least one of said coin chutes; a variable change-making device for delivering change in proper amount according to the difference between the price of the commodity vended and the value of the coin or coins introduced; and means for actuating said device upon each operation of the vending mechanism.

10. In a commodity vending machine; a vending mechanism provided with means adapting it to the sale of commodities in varying quantity or package size; a variable coin device for operating said vending mechanism upon the introduction of a suitable coin or combination of coins; and a variable change-making device for delivering change in proper amount according to the difference between the price of the commodity vended and the value of the coin or coins introduced, said last mentioned device comprising a coin receptacle provided with a discharge passage, a coin ejector operable to discharge a predetermined number of coins from said receptacle, and means operated by the vending mechanism for actuating said coin ejector.

11. A commodity vending machine comprising, in combination; a frame; a chain conveyor mounted in said frame and provided with a series of merchandise containers; a motor and a control circuit therefor for operating said conveyor; coin-operated means including switch devices operable to close said circuit to start movement of said conveyor upon the introduction of a suitable coin or combination of coins; means for opening said switch devices to stop movement of the conveyor; and means carried by the conveyor for actuating said last-mentioned means after the presentation of a predetermined number of said containers to the discharge port.

12. A commodity vending machine comprising; a movable carrier provided with a series of merchandise containers adapted to be moved to and from a discharge port; coin-operated means for controlling the movement of said carrier; means for stopping movement of the carrier after the presentation of a predetermined number of said containers to the discharge port; change-making mechanism operable to deliver with the article dispensed from the machine a number of coins equal in value to the difference between the price of the article sold and the value of the coin or coins introduced; and means supported in said carrier for actuating said change-making mechanism upon each vending operation.

13. A commodity vending machine comprising; an endless chain conveyor provided with a series of individual bucket containers affording compartments for holding articles of merchandise; means for moving said conveyor to successively present said containers to a discharge port; coin-operated means for controlling said conveyor moving means; change-making mechanism operable to deliver with the article dispensed from the machine a number of coins equal in value to the difference between the price of the article sold and the value of the coin or coins introduced; and means for actuating said change-making mechanism upon each operation of the vending mechanism.

14. A commodity vending machine comprising; a carrier provided with a series of containers affording compartments for holding articles of merchandise; coin-controlled means operable to move said carrier to successively present said containers to a discharge port; change-making mechanism operable to deliver with the article dispensed from the machine a number of coins equal in value to the difference between the price of the article sold and the value of the coin or coins introduced; and means supported on said carrier for actuating said change-making mechanism upon each vending operation.

15. A commodity vending machine comprising, in combination; a frame provided with a guard plate, said guard plate being apertured to provide a discharge port; a conveyor mounted in said frame adjacent said guard plate, said conveyor being provided with a series of containers affording compartments for holding articles of merchandise; a motor and a control circuit therefor for operating said conveyor; coin-operated means including switch devices operable to close said circuit to start movement of said conveyor upon the introduction of a suitable coin or combination of coins; means for opening said switch devices to stop movement of said conveyor and means carried by the conveyor for actuating said last-mentioned means after the presentation of a predetermined number of said containers to the discharge port.

16. A commodity vending machine comprising, in combination; a frame; a conveyor mounted in said frame and provided with a series of containers affording compartments for holding articles of merchandise; means for moving said conveyor to successively present said containers to a discharge port; coin-operated means for controlling said conveyor moving means, said coin-operated means being operable to start movement of the conveyor upon the introduction of a suitable coin or combination of coins; means for stopping movement of said conveyor after the presentation of a predetermined number of said containers to the discharge port; change-making mechanism operable to deliver with the article dispensed from the machine a number of coins equal in value to the difference between the price of the article sold and the value of the coin or coins introduced; and means for actuating said change-making mechanism upon each operation of the vending mechanism.

17. A commodity vending machine comprising, a conveyor, a series of bucket containers mounted on said conveyor, said containers affording compartments for holding articles of merchandise, means for moving said conveyor to successively present said containers to a discharge port, means operable to allow a series of articles to be dispensed from said containers during the initial revolution of the conveyor and a second series of articles therefrom upon an additional revolution of the conveyor.

18. A commodity vending machine comprising, in combination; a frame; a conveyor mounted in said frame and provided with a series of containers affording compartments for holding articles of merchandise; means for moving said conveyor to successively present said containers to a discharge port; coin-operated means for controlling said conveyor moving means, said coin operated means being operable to start movement of the conveyor upon the introduction of a suitable coin or combination of coins; means for stopping movement of said conveyor after the presentation of a predetermined number of said containers to the discharge port; means operable to allow a series of articles to be dispensed from the machine during the initial revolution of the conveyor and a second series of articles therefrom upon an additional revolution of the conveyor.

19. A commodity vending machine comprising, in combination; a frame; a conveyor mounted in said frame and provided with a series of containers affording compartments for holding articles of merchandise; means for moving said conveyor to successively present said containers to a discharge port; coin-operated means for controlling said conveyor moving means, said coin-operated means being operable to start movement of the conveyor upon the introduction of a suitable coin or combination of coins; means for stopping movement of said conveyor after the presentation of a predetermined number of said containers to the discharge port; change-making mechanism operable to deliver with the article dispensed from the machine a number of coins equal in value to the difference between the price of the article sold and the value of the coin or coins introduced; means for actuating said change-making mechanism upon each operation of the vending mechanism; means operable to allow a series of articles to be dispensed from the machine during the initial revolution of the conveyor and a second series of articles therefrom upon an additional revolution of the conveyor.

20. A commodity vending machine comprising, in combination; a frame; a conveyor mounted in said frame and provided with a series of containers affording compartments for holding articles of merchandise; a guard plate disposed adjacent said conveyor; said plate being apertured to provide a discharge port; a gate mounted adjacent said guard plate and adapted to close a portion of said discharge port; a second gate mounted adjacent said guard plate and adapted to close an adjacent portion of said discharge port; means for moving said conveyor to successively present said containers to the discharge port; coin-operated means for controlling said conveyor moving means, said coin-operated means being operable to start movement of the conveyor upon the introduction of a suitable coin or combination of coins; means for stopping movement of said conveyor after the presentation of a predetermined number of said containers to the discharge port; and means operable to cause a series of articles to be dispensed from the machine during the initial revolution of the conveyor and a second series of articles therefrom upon an additional revolution of the conveyor, said means comprising, a series of partitioning elements adapted to divide said containers to afford a tier of merchandise compartments positioned opposite said first mentioned gate and a second tier of compartments positioned opposite said second gate, a latch member for holding said second gate in closed position during the first revolution of the conveyor, said first mentioned gate being open, and a cam member carried by the conveyor and operable to release said latch member after the first complete revolution of said conveyor.

21. A commodity vending machine comprising, in combination; a frame; a conveyor mounted in said frame and provided with a series of containers affording compartments for holding articles of merchandise; a motor for moving said conveyor to successively present said containers to a discharge port; and coin-operated means for controlling said motor, said means comprising a series of coin chutes having slots for the introduction of coins, coin-operated switches individual to said coin chutes, said switches being collectively adapted to close a circuit through said motor, and manually controlled switches operable in conjunction with said coin-operated switches to cause the motor circuit to be closed upon the introduction of a coin in one or more but less than all of said coin chutes.

22. A commodity vending machine comprising, in combination; a frame; a conveyor mounted in said frame and provided with a series of containers affording compartments for holding articles of merchandise; a motor for moving said conveyor to successively present said containers to a discharge port; coin-operated means for controlling said motor, said means comprising a series of coin chutes having slots for the introduction of coins, coin-operated switches individual to said coin chutes, said switches being collectively adapted to close a circuit through said motor, and manually controlled switches operable in conjunction with said coin-operated switches to cause the motor circuit to be closed upon the introduction of a coin in one or more but less than all of said coin chutes; and means for stopping movement of said conveyor after the presentation of a predetermined number of said containers to the discharge port.

23. A commodity vending machine comprising, in combination; a frame; a conveyor mounted in said frame and provided with a series of containers affording compartments for holding articles of merchandise; a motor for moving said conveyor to successively present said containers to a discharge port; and coin-operated means for controlling said motor, said means comprising a series of coin chutes having slots for the introduction of coins, a mask plate provided with openings adapted to expose said coin slots individually or in any selected combination, coin-operated switches individual to said coin chutes, said switches being collectively adapted to close a circuit through said motor, and manually controlled switches operable in conjunction with said coin-operated switches to cause the motor circuit to be closed upon the introduction of coins in the exposed slots.

24. A commodity vending machine comprising, in combination; a frame; a conveyor mounted in said frame and provided with a series of containers affording compartments for holding articles of merchandise; a motor for moving said conveyor to successively present said containers to a discharge port; coin-operated means for controlling said motor, said means comprising a series of coin chutes having slots for the introduction of coins, a mask plate provided with openings adapted to expose said coin slots individually or in any selected combination, coin-operated switches individual to said coin chutes, said switches being collectively adapted to close a circuit through said motor, and manually controlled switches operable in conjunction with said coin operated switches to cause the motor circuit to be closed upon the introduction of coins in the exposed slots; and means for stopping movement of said conveyor after the presentation of a predetermined number of said containers to the discharge port.

25. A commodity vending machine comprising, in combination; a frame; a conveyor mounted in said frame and provided with a series of containers affording compartments for holding articles of merchandise; a motor for moving said conveyor to successively present said containers to a discharge port; coin-operated means for starting said motor upon the introduction of a suitable coin or combination of coins, said means including a series of coin chutes provided with coin-operated switches for closing a circuit through the motor; manually controlled switches acting in conjunction with said coin switches to start the motor upon the introduction of a coin in at least one of said coin chutes; and means actuated by movement of the conveyor for stopping said motor after the presentation of a predetermined number of said containers to the discharge port.

26. A commodity vending machine comprising, in combination; a frame; a conveyor mounted in said frame and provided with a series of containers affording compartments for holding articles of merchandise; a motor for moving said conveyor to successively present said containers to a discharge port; coin-operated means for starting said motor upon the introduction of a suitable coin or combination of coins, said means including a series of coin chutes provided with coin slots, switches individual to said coin chutes, and coin operated levers for closing said switches; manually controlled switches acting in conjunction with said coin switches to start the motor upon the introduction of a coin in at least one of said coin chutes; and means for stopping movement of the conveyor after the presentation of a predetermined number of said containers to the discharge port, said means including a rocker arm operatively connected with said coin operated levers, and cam elements carried on the conveyor and positioned to actuate said rocker arm and open said switches after a predetermined extent of movement of said conveyor.

27. In a commodity vending machine; a carrier provided with a series of containers affording compartments for holding articles of merchandise; a motor for moving said carrier to successively present said containers to a discharge port; and coin-controlled means operable to start movement of said carrier upon the introduction of a suitable coin or combination of coins, said means including a series of coin chutes provided with coin slots, coin controlled switches operable collectively to close a circuit through said motor, and manually controlled switches operable in conjunction with said coin-controlled switches to cause the circuit through said motor to be closed upon the introduction of a coin in one or more but less than all of said coin chutes.

28. A commodity vending machine comprising; a carrier provided with a series of containers affording compartments for holding articles of merchandise; a motor for moving said carrier to successively present said containers to a discharge port; coin-controlled means operable to start movement of the carrier upon the introduction of a suitable coin or combination of coins, said means including a series of coin chutes provided with coin slots, coin-controlled switches operable collectively to close a circuit through said motor, and manually controlled switches operable in conjunction with said coin-controlled switches to cause the circuit through said motor to be closed upon the introduction of a coin in one or more but less than all of said coin chutes; change-making mechanism operable to deliver with the article dispensed from the machine a number of coins equal in value to the difference between the price of the article sold and the value of the coin or coins introduced, and means for actuating said change-making mechanism upon each operation of the vending mechanism.

29. In a commodity vending machine; a carrier provided with a series of containers affording compartments for holding articles of merchandise; a motor for moving said carrier to successively present said containers to a discharge port; and coin-controlled means operable to start movement of said carrier upon the introduction of a suitable coin or combination of coins, said means including a series of coin chutes provided with coin slots, a mask plate adapted to expose said slots individually or in any selected combination, coin-controlled switches operable collectively to close a circuit through said motor, and manually controlled switches operable in conjunction with said coin-controlled switches to cause the circuit through said motor to be closed upon the introduction of coins in the exposed slots.

30. A commodity vending machine comprising, in combination; a frame; a conveyor mounted in said frame and provided with a series of containers affording compartments for holding articles of merchandise; a motor for moving said conveyor to successively present said containers to a discharge port; coin operated means for controlling said motor, said means comprising a series of coin chutes having slots for the introduction of coins, coin operated switches individual to said coin chutes, said switches being collectively adapted to close a circuit through said motor, and manually controlled switches operable in conjunction with said coin-operated switches to cause the motor circuit to be closed upon the introduction of a coin in one or more but less than all of said coin chutes; change-making mechanism operable to deliver with the article dispensed from the machine a number of coins equal in value to the difference between the price of the article sold and the value of the coin or coins introduced; and means for actuating said change-making mechanism upon each operation of the vending mechanism.

31. A commodity vending machine comprising; a conveyor, a series of bucket containers mounted on said conveyor, said containers affording compartments for holding articles of merchandise; coin-controlled means operable to move said conveyor to successively present said containers to a discharge port; and change-making mechanism operable to deliver with the article dispensed from the machine a number of coins equal in value to the difference between the price of the article sold and the value of the coin or coins introduced, said mechanism comprising a coin receptacle provided with a discharge passage, an adjustable coin rest mounted in said coin receptacle, a coin ejector, and means carried by said conveyor for actuating said coin ejector.

32. A commodity vending machine comprising, in combination; a frame; a conveyor mounted in said frame and provided with a series of merchandise containers adapted to be moved to and from a discharge port; coin-operated means operable to start movement of said conveyor upon the introduction of a suitable coin or combination of coins; means for stopping movement of the conveyor after the presentation of a predetermined number of said containers to the discharge port; change-making mechanism operable to deliver with the article dispensed from the machine a number of coins equal in value to the difference between the price of the article sold and the value of the coin or coins introduced; and means for actuating said change-making mechanism upon each operation of the vending mechanism.

33. A commodity vending machine comprising, in combination; a frame; a conveyor mounted in said frame and provided with a series of merchandise containers adapted to be moved to and from a discharge port; coin-operated means operable to start movement of said conveyor upon the introduction of a suitable coin or combination of coins; means for stopping movement of the conveyor after the presentation of a predetermined number of said compartments to the discharge port; and change-making mechanism operable to deliver with the article dispensed from the machine a number of coins equal in value to the difference between the price of the article sold and the value of the coin or coins introduced, said mechanism comprising a coin receptacle provided with a discharge passage, an adjustable coin rest mounted in said coin receptacle, a coin ejector, and means carried by said conveyor for actuating said coin ejector.

34. A commodity vending machine comprising, in combination; a frame; a conveyor mounted in said frame and provided with a series of merchandise containers adapted to be moved to and from a discharge port; coin-operated means operable to start movement of said conveyor upon the introduction of a suitable coin or combination of coins; means operated by the conveyor for holding and displaying the inserted coins between successive vending operations; and means for stopping movement of the conveyor after the presentation of a predetermined number of said containers to the discharge port.

35. A commodity vending machine comprising, in combination; a frame; a conveyor mounted in said frame and provided with a series of merchandise compartments adapted to be moved to and from a discharge port; coin operated means operable to start movement of said conveyor upon the introduction of a suitable coin or combination of coins; means operated by the conveyor for holding and displaying the inserted coins between successive vending operations; means for momentarily holding the inserted coins pending the release of the previously inserted coins from said display means; and means for stopping movement of the conveyor after the presentation of a predetermined number of said compartments to the discharge port.

36. A commodity vending machine comprising, in combination; a frame; a conveyor mounted in said frame and provided with a series of containers affording compartments for holding articles of merchandise; means for moving said conveyor to successively present said containers to a discharge port; coin-operated means for controlling said conveyor moving means, said coin-operated means being operable to start movement of the conveyor upon the introduction of a suitable coin or combination of coins; means for stopping movement of said conveyor after the presentation of a predetermined number of said containers to the discharge port; change-making mechanism operable to deliver with the article dispensed from the machine a number of coins equal in value to the difference between the price of the article sold and the value of the coin or coins introduced; means for actuating said change-making mechanism upon each operation of the vending mechanism; and means for preventing introduction of coins into the machine after the merchandise has been dispensed therefrom.

37. A commodity vending machine comprising in combination; a frame; a conveyor mounted in said frame and provided with a series of merchandise containers adapted to be moved to and from a discharge port; coin-operated means operable to start movement of the conveyor upon the introduction of a suitable coin or combination of coins, said means including a series of coin chutes provided with slots for the introduction of coins; means for stopping movement of the conveyor after the presentation of a predetermined number of said containers to the discharge port; and means for preventing introduction of coins into the machine after the merchandise has been dispensed therefrom, said last mentioned means including a mask plate provided with openings adapted to expose said coin slots individually or in any selected combination, and means for shifting said plate to close the slots at the end of a predetermined number of revolutions of said conveyor.

38. A commodity vending machine comprising, in combination; a frame; a conveyor mounted in said frame and provided with a series of merchandise containers adapted to be moved to and from a discharge port; coin-operated means operable to start movement of the conveyor upon the introduction of a suitable coin or combination of coins, said means including a series of coin chutes provided with slots for the introduction of coins; means for stopping movement of the conveyor after the presentation of a predetermined number of said containers to the discharge port; and means for preventing introduction of coins into the machine after the merchandise has been dispensed therefrom, said last mentioned means including a mask plate provided with openings adapted to expose said coin slots individually or in any selected combination, and means controlled by movement of the conveyor for shifting said plate to close the slots at the end of a predetermined number of revolutions of said conveyor.

39. A commodity vending machine comprising, in combination; a frame; a conveyor mounted in said frame and provided with a series of merchandise containers adapted to be moved to and from a discharge port; coin-operated means operable to start movement of the conveyor upon the introduction of a suitable coin or combination of coins, said means including a series of coin chutes provided with slots for the introduction of coins; means for stopping movement of the conveyor after the presentation of a predetermined number of said containers to the discharge port; and means for preventing introduction of coins into the machine after the merchandise has been dispensed therefrom, said last mentioned means including a mask plate provided with openings adapted in the open position of the plate to expose said coin slots individually or in any selected combination, a latch for holding said plate in the open position, a spring for shifting said plate to close the slots, and means operable to release said latch at the end of a predetermined number of revolutions of said conveyor.

40. A commodity vending machine, comprising in combination; a frame; a chain conveyor mounted in said frame and provided with a series of merchandise containers adapted to be moved to and from a discharge port; coin-operated means operable to start movement of said conveyor upon the introduction of a suitable coin or combination of coins; means for stopping movement of the conveyor; means carried by the conveyor for actuating said last-mentioned means after the presentation of a predetermined number of said containers to the discharge port; and a signal device for indicating when the last article has been dispensed from the machine.

41. In a commodity vending machine the combination of vending mechanism, including conveyor for dispensing articles of merchandise and means adapting said conveyor to the delivery of commodities in varying quantity or package size; a motor and a control circuit therefor for operating said conveyor; coin-operated mechanism including switch devices associated with said control circuit for closing the latter to start movement of the conveyor upon introduction of a suitable coin or coins; means for automatically stopping movement of the conveyor after a predetermined movement of the latter; and means for setting said coin mechanism to receive varying numbers of coins as may be necessary to the vending of commodities of different value.

42. In a commodity vending machine the combination of vending mechanism, including a conveyor for dispensing articles of merchandise and means adapting said conveyor to the delivery of commodities in varying quantity or package size; a motor and a control circuit therefor for operating said conveyor; coin-operated mechanism including switch devices associated with said control circuit for closing the latter to start movement of the conveyor upon introduction of a suitable coin or coins; means carried by the conveyor for throwing said devices to open circuit position, whereby to stop movement of the conveyor after a predetermined movement of the latter; and means for setting said coin mechanism to receive varying numbers of coins as may be necessary to the vending of commodities of different value.

43. In a commodity vending machine the combination of vending mechanism, including a conveyor and a series of merchandise containers adapted to be supported therein; means for releasably securing said containers to the conveyor, said means being arranged to receive containers of different sizes whereby to adapt the vending mechanism to the sale of commodities of different quantity or size; a motor and a control circuit therefor for moving said conveyor to successively present said containers to a discharge station; coin-operated mechanism including switch devices associated with said control circuit for closing the latter to start movement of the conveyor upon introduction of a suitable coin or coins; means associated with said containers for throwing said devices to open circuit position, whereby to stop movement of the conveyor; and means for setting said coin mechanism to receive varying numbers of coins as may be necessary to the vending of commodities of different value.

FRED L. MILLS.